United States Patent
Hartmann et al.

(10) Patent No.: US 7,563,398 B2
(45) Date of Patent: *Jul. 21, 2009

(54) MELT SPINABLE CONCENTRATE PELLETS HAVING ENHANCED REVERSIBLE THERMAL PROPERTIES

(75) Inventors: Mark Henry Hartmann, Superior, CO (US); Monte Christopher Magill, Longmont, CO (US)

(73) Assignee: Outlast Technologies, Inc., Boulder, CO (US)

(*) Notice: Subject to any disclaimer, the term of this patent is extended or adjusted under 35 U.S.C. 154(b) by 995 days.

This patent is subject to a terminal disclaimer.

(21) Appl. No.: 10/891,428

(22) Filed: Jul. 13, 2004

(65) Prior Publication Data

US 2005/0035482 A1     Feb. 17, 2005

Related U.S. Application Data

(63) Continuation of application No. 09/777,512, filed on Feb. 6, 2001, now Pat. No. 6,793,856.

(60) Provisional application No. 60/234,150, filed on Sep. 21, 2000.

(51) Int. Cl.
| | |
|---|---|
| B29B 9/06 | (2006.01) |
| B28B 11/12 | (2006.01) |
| C08J 5/00 | (2006.01) |
| D01F 1/02 | (2006.01) |
| C08K 3/00 | (2006.01) |
| C08K 5/01 | (2006.01) |
| C08K 3/34 | (2006.01) |

(52) U.S. Cl. .......... 264/141; 264/157; 264/331.13; 264/331.17; 264/211; 524/8; 524/476; 524/477; 524/478; 524/493

(58) Field of Classification Search .......... None
See application file for complete search history.

(56) References Cited

U.S. PATENT DOCUMENTS

| | | | | | |
|---|---|---|---|---|---|
| 4,756,958 | A | * | 7/1988 | Bryant et al. | 428/320.2 |
| 4,908,166 | A | * | 3/1990 | Salyer | 264/470 |

(Continued)

FOREIGN PATENT DOCUMENTS

| | | |
|---|---|---|
| KR | 2005-269955 | 12/2004 |

(Continued)

OTHER PUBLICATIONS

European Patent Office, Supplementary European Search Report, Feb. 18, 2008, 6 pages, Munich, Germany.

(Continued)

*Primary Examiner*—Jeffrey Wollschlager
(74) *Attorney, Agent, or Firm*—Neugeboren O'Dowd PC

(57) ABSTRACT

A process for manufacturing extrudable/melt spinnable concentrate pellets which contain phase change materials (PCMs), whether the PCMs are micro-encapsulated absorbed into carrier polymers, or non-micro-encapsulated within the concentrate pellets. The polymer matrix within the concentrate pellets can be any thermoplastic polymer or combination of thermoplastic polymers, and the concentrate pellets can then be blended into similar thermoplastic polymers to form mono-filament melt spun fibers, extruded films, injection molded products, etc., or the concentrate pellets can be blended with other thermoplastic polymers to form bi-component or multi-component melt spun fibers, extruded films, injection molded products, etc.

10 Claims, 1 Drawing Sheet

U.S. PATENT DOCUMENTS

| | | | |
|---|---|---|---|
| 5,053,446 A | | 10/1991 | Salyer |
| 5,565,132 A | * | 10/1996 | Salyer ..................... 252/70 |
| 6,793,856 B2 | * | 9/2004 | Hartmann et al. .......... 264/141 |
| 2003/0035951 A1 | | 2/2003 | Magill et al. |
| 2005/0035482 A1 | | 2/2005 | Hartmann et al. |

FOREIGN PATENT DOCUMENTS

| | | |
|---|---|---|
| WO | 03/068414 A1 | 8/2003 |
| WO | 2005/017247 A1 | 2/2005 |

OTHER PUBLICATIONS

PCT Notification concerning transmittal of international preliminary report on patentability (Chapter 1 of the Patent Cooperation Treaty), Sep. 20, 2007, International application No. PCT/US2006/006216, 6 pages.

Neugeboren O'Dowd PC, Response to Office Action in U.S. Appl. No. 11/078,656, filed Jan. 22, 2009, 11 Pages.

USPTO, Final Rejection in U.S. Appl. No. 11/078,656, filed Apr. 2, 2009, 7 Pages.

* cited by examiner

MELT SPINABLE CONCENTRATE PELLETS HAVING ENHANCED REVERSIBLE THERMAL PROPERTIES

CROSS-REFERENCE TO RELATED APPLICATIONS

This patent application is a continuation of U.S. non-provisional patent application Ser. No. 09/777,512, filed Feb. 6, 2001, now U.S. Pat. No. 6,793,856, which claims the benefit of U.S. provisional patent application Serial No. 60/234,150, filed Sep. 21, 2000.

This application incorporates by reference the disclosure of the following U.S. provisional patent applications, owned by the assignee of the present application: "Melt Spinnable Multi-component Fibers Having Enhanced Reversible Thermal Properties," by Monte Magill, Ser. No. 60/234,410, filed Sep. 21, 2000 (now non-provisional patent application Ser. No. 09/960,591, filed Sep. 21, 2001, now abandoned); and "Thermally Stable Phase Change Material For Use In Temperature Regulating Fibers, Fabrics And Textiles," by Monte Magill and Mark Hartmann. Ser. No. 60/234,149, filed Sep. 21, 2000 (now non-provisional patent application Ser. No. 09/960,901, filed Sep. 21, 2001, now U.S. Pat. 6,689,466).

BACKGROUND OF THE INVENTION

1. Field of the Invention

This invention relates to the manufacture of melt spun synthetic fibers having temperature regulation properties, the melt spun fibers being formed from polymer-based concentrate pellets that have Phase Change Materials (PCMs) therein.

2. Description of the Related Art

Many fabric materials are made from synthetic fibers. Two processes—a wet solution process and a melt spun process—are generally used for making synthetic fibers. The wet solution process is generally used to form acrylic fibers, while the melt spun process is used to form nylons, polyesters, polypropylenes, and other similar type fibers. A large portion of the fibers that are used in the textile industry are made via the melt spun process.

As is well known, nylon is a family of polyamide polymers characterized by the presence of the amide group CONH; polyester fiber is a fiber in which the fiber-forming substance is a long chain synthetic polymer composed of at least 85-percent by weight of an ester of a dihydric alcohol and terephthalic acid; and polypropylene ($C_3H_5$) is a synthetic crystalline thermoplastic polymer having a molecular weight of about 40,000 or more.

The melt spun manufacturing process generally involves passing a melted polymeric material or pellets through a device known as a spinneret, to thereby form individual polymeric fibers. The fibers are then made into a filament/strand, or into a cut staple. After the fibers have been formed, the fibers can be used to make non-woven material, or alternatively, the fibers can be wound into a yarn that is comprised of individual fibers, the yarn to be used thereafter in the weaving or knitting of a fabric material.

In order to provide a thermal regulation property to fabric materials, microencapsulated phase change materials (microPCMs or mPCMs) have been incorporated into acrylic fibers that were made using an aqueous batch (solution) process. However, with respect to synthetic fibers that are made by the melt spun manufacturing process wherein excessive amounts of volatile materials should not be present, conventional aqueous batch methods for incorporating mPCMs into the fibers are problematic.

It is against this background that embodiments of the present invention were developed.

SUMMARY OF THE INVENTION

According to one aspect of the present invention, disclosed herein is a process for manufacturing melt spinnable concentrate pellets that contain Phase Change Materials (PCMs), but do not contain an excessive amount of volatile materials. In accordance with this invention, the PCMs can be microencapsulated PCMs that are within the concentrate pellets, the PCMs can be absorbed into carrier polymers that form the concentrate pellets, and/or non-micro-encapsulated PCMs can be included as a component of the concentrate pellets.

According to the invention, the melt spinnable concentrate pellet matrix, or carrier polymer, can be any thermoplastic polymer or any combination of thermoplastic polymers.

Concentrate pellets in accordance with the invention, can be blended into similar thermoplastic polymers and the blend can then be extruded to form monofilament melt spun fibers, extruded films, injection molded products, etc., or the concentrate pellets can be blended with different thermoplastic polymers and the blend can then be extruded to form bicomponent or multi-component melt spun fibers, multi-component extruded films, multi-component injection molded products, etc.

For example, polypropylene concentrate pellets that contain PCMs or mPCMs can be blended with an additional amount of the polypropylene polymer and then melt spun to form polypropylene monofilament fibers, or this same polypropylene concentrate pellet can be blended with, or bicomponent melt spun with, an amount of nylon polymer to form bicomponent polypropylene/nylon fibers.

In accordance with a feature of the invention, but without limitation thereto, a PCM(s), and preferably a microencapsulate PCM(s), in a wet-cake form (i.e. in a water-based form) that comprises about 70 weight-percent solids and about 30 weight percent water, is melt-blended with a low molecular weight dispersing-polymer, with the result that about all of the water that is within the wet cake is driven off as the PCM(s) is concomitantly generally uniformly dispersed throughout the low molecular weight dispersing polymer.

In this mixture of a PCM(s) and a low molecular weight dispersing polymer, the dispersing polymer is selected for its compatibility with, and for its affinity for, the PCM(s), thus providing for an optimum dispersion of the PCM(s) throughout the dispersing polymer.

Granules of the above-described PCM/dispersion polymer are then melt blended with a high molecular weight polymer in order to produce concentrate pellets of the invention that contain about 15 weight percent of the PCM(s).

This high molecular weight polymer is selected for its affinity for the low molecular weight polymer and for the physical qualities that are desired of articles (i.e., fibers and the like) that are extruded, or melt spun in conventional manners using the concentrate pellets of the invention.

The foregoing and other features, utilities and advantages of the invention will be apparent from the following description of preferred embodiments of the invention.

DESCRIPTION OF PREFERRED EMBODIMENTS

In accordance with the present invention, a process is disclosed for making concentrate pellets of one or more polymers, each pellet having one or more PCMs therein, the concentrate pellets being adapted for use in extrusion and melt spun manufacturing processes.

The concentrate pellet manufacturing process of this invention provides benefits that are achieved by adding PCMs to products that are manufactured using extrusion processes such as the melt spun process, non-limiting examples being fibers such as nylon fibers, polyester fibers, polyethylene fibers and polypropylene fibers, films, and injection molded articles.

Figure 1:
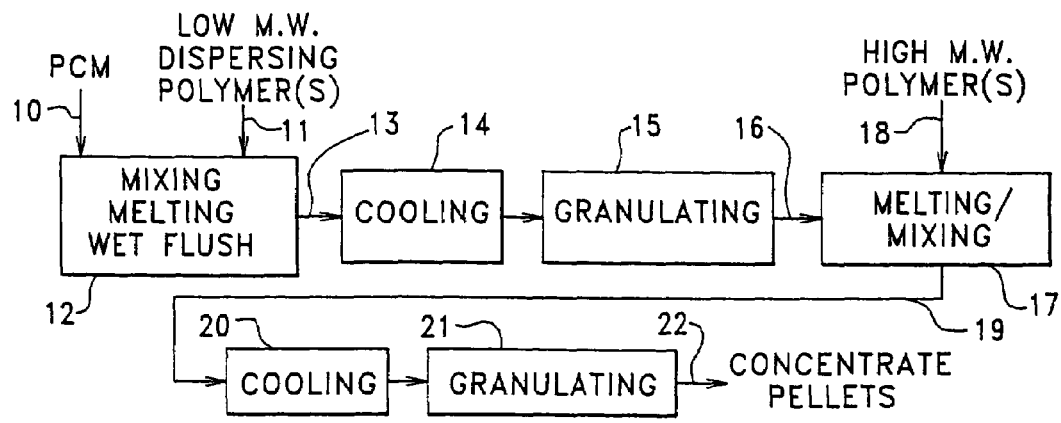
FIG. 1, FIG. 2, and FIG. 3 illustrate methods of making and manufacturing polymer-based pellets according to some embodiments of the invention.
Figure 2:
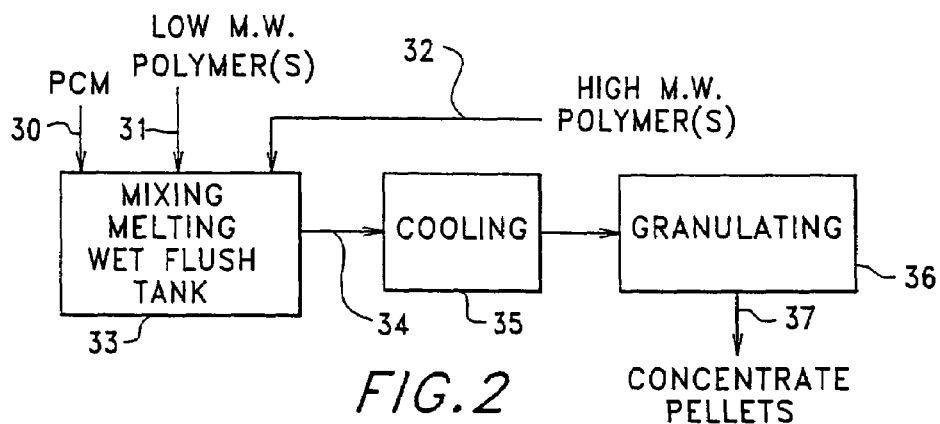
Figure 3:
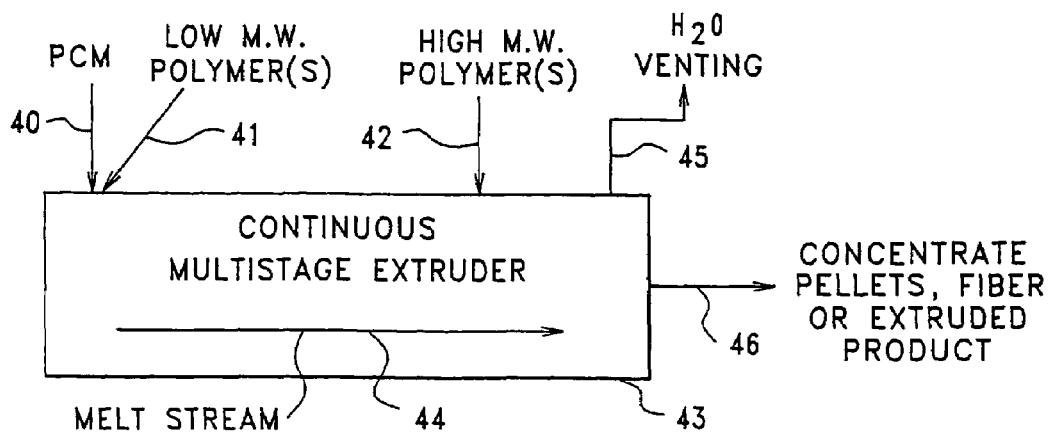

The present invention forms concentrate pellets having enhanced reversible thermal properties, which concentrate pellets can then be used to make temperature regulating articles having PCMs therein, the melt spun fiber manufacturing process being an example.

The PCMs of the invention can be in a microencapsulated form wherein a hollow capsule or hollow shell having a diameter of from about 1 to about 3 microns protects the PCMs that are within the capsule/shell from exposure to the high temperature and high shear processing that is commonly found in the manufacture of melt spun fibers and melt spun fiber components.

The PCMs of the invention can be contained within, surrounded by, or encapsulated within a number of polymer matrix formats, or within carrier polymers, to thereby provide for the ease of handling of the PCMs, while at the same time, offering a degree of protection to the PCMs from the harsh environment of the extrusion/melt spin processing the PCM-containing concentrate pellets, as well as protecting the PCMs that are within melt spun fibers from subsequent fiber processing.

In accordance with the invention, raw or not-capsulated PCMs can be incorporated into a process by which the concentrate pellets of the invention are manufactured. In this case, the PCMs are preferably introduced into the concentrate pellet manufacturing process via one of the late pellet manufacturing steps, to thereby minimize exposure of the PCMs to high temperature processing.

In one example of the invention, the PCMs are incorporated into any of the many process steps by which the concentrate pellets are manufactured.

In another example, a wetflush process is used to form a plurality of plastic-based granules, each granule containing mPCMs. Preferably, approximately 50 weight percent of a selected mPCM is placed in a compatiblizer plastic, and the PCM/plastic mixture is then ground down to form a plurality of granules, each granule containing mPCM. After the granules are formed, concentrate pellets are formed from the mPCM granules by adding a virgin thermoplastic polymer, to thereby reduce the mPCM concentration within the finished concentrate pellet product. In one example, the resulting concentrate pellets included about 15 weight percent mPCM in relation to the thermoplastic polymer.

In accordance with a feature of the invention, the above-described compatiblizer plastic is a low molecular weight dispersing polymer, and the above-described virgin thermoplastic polymer is a high molecular weight polymer, the low molecular weight dispersing polymer being selected for its compatibility with, and for its affinity for, the mPCM, and the virgin thermoplastic polymer being selected for its affinity for the low molecular weight polymer and for the physical qualities that are desired of articles that are extruded or melt spun in conventional manners using the concentrate pellets of the invention.

Upon formation of concentrate pellets of the invention, the concentrate pellets can be extruded/melt spun as is (for example, to produce monofilament fibers that contain about 15 weight percent of the mPCM), or the concentrate pellets can be blended with another polymer(s) and then extruded/melt spun, for example, to produce multi component fibers having, for example, from about 5 to about 10 weight percent of the mPCM.

Finally, upon the formation of the PCM containing individual fibers as above described, a desired fiber material, fabric material or textile material is formed. As described above, the individual fibers can then be used to manufacture a non-woven material, or the fibers can be used by way of a yarn spinning process to manufacture fabric or textile materials using a weaving process, a knitting process, or the like. It is understood that the fiber/fabric/textile material that is manufactured from the fibers is a matter of choice, and is not critical to this invention. The manufactured fiber/fabric/textile material will contain the above-described PCM, and as a result will exhibit thermal regulatory properties.

It should also be noted that the above-described concentrate pellet manufacturing process is applicable to raw or un-encapsulated PCMs, wherein the PCM is placed into the concentrate pellets and the concentrate pellets are then passed through an extrusion or melt-spun manufacturing process to form extruded/melt spun articles such as fibers having the PCM contained or held within a plurality of isolated volumes or spaces that are dispersed throughout the article.

In accordance with embodiments of the present invention, concentrate pellets can be manufactured using a variety of manufacturing processes; for example, 1) the use of mPCM containment systems, 2) the use of gelled containment PCM systems, 3) the use of alternative containment PCM systems, or 4) the addition of non-contained raw or non-micro-encapsulated PCM systems.

One such process for use with mPCMs involves wet flushing and/or subsequent compounding of the mPCM into a thermoplastic polymer matrix or carrier. In one example, wet flushing consisted of the addition of a dispersing-polymer into a heated mixing bowl and then melting the polymer. Preferably, but without limitation thereto, the dispersing-polymer was a low molecular weight polymer. Upon melting of the dispersing-polymer, mPCM wet cake was slowly added to the molten polymer and permitted to disperse as, at the same time, water was flashed or flushed off. Upon completion of the dispersion and the removal of water, the dispersed mPCM/polymer concentrate was removed, cooled, and thereafter chopped into granules of acceptable dimensions for later blending.

The above-described dispersing polymer may include graft, homo, or copolymers of polyolefins, polyamides, polyesters, or other thermoplastic polymers that are compatible with, and have an affinity for, the final polymer matrix of the melt extruded concentrate pellet product, which final polymer matrix is preferably a high molecular weight polymer matrix.

The above-described mPCM wet cake may consist of between about 1 and 90 weight percent solids in water, and preferably contains between about 60 and 70 weight percent solids. Final concentrations of the mPCM in the wet cake concentrate can be from about 30 to about 60 weight percent, and preferably it is from about 45 to about 55 weight percent.

To insure improved mixing in the final extruded concentrate pellet product, the wet flush concentrate can be further blended into the finished product polymer matrix, to yield a concentrate pellet containing mPCM of about 10 to about 30% weight percent, and preferably about 15 weight percent.

PCMs can be gelled, absorbed or physically contained in a number of ways. One such means of gelling or physical containment is by the addition of silica particles, fumed silica particles, zeolite particles or absorbent polymers to the PCM to provide for ease of addition to the above-described dispersing polymer.

PCMs that are physically contained can then be manufactured into concentrate pellets in a manner similar to the above-described process. One preferred method is by removing the above-described wet flushing step and simply blending the PCMs with the dispersing-polymer, or with the final matrix polymer of the concentrate pellet when the concentrate pellet is extruded. This process yields concentrate pellets with PCM concentrations similar to those described above; for example, from about 5 to about 70 weight percent, and preferably about 15 weight percent.

PCMs that are not micro-encapsulated or otherwise contained can also be processed into concentrate pellets via the liquid injection of the PCM into the concentrate pellet melt extrusion process, or by the co-feeding of solid PCM with the concentrate pellet's dispersing-polymer.

Liquid PCM can be thoroughly filtered and mixed to insure homogeneity prior to injection. Liquid injection of the PCM can occur at any time in the pellet melt extrusion process, but preferably it occurs as late in the process as is possible in order to insure adequate mixing and in order to minimize exposure of the PCM to high temperature. By using this late-stage PCM addition method, exposure of the PCM to high temperatures and to any subsequent degradation or loss of PCM is reduced.

Solid PCM can be processed into concentrate pellets by simply co-feeding the solid PCM and the pellet dispersing or matrix polymer resin into the feed throat of the pellet melt extruder. Solid PCMs can also be side stuffed into the pellet melt extruder in order to prevent feed throat plugging.

The above processes yield concentrate pellets having PCM concentrations in about the 5 to 70% weight percent range, and preferably in about the 15 to 25% weight percent range.

This invention provides temperature regulating benefits that are achieved by adding PCMs to synthetic articles such as fibers, films, foams and injection-molded members, which articles that are made by extrusion processes of which the melt spin manufacturing of fibers is a non-limiting example.

In accordance with this invention, at least one water-based PCM is added to a melted dispersing-polymer that has an affinity for the PCM. For example, if the PCM comprises a plurality of individual PCM volumes, with each volume encased within a shell (i.e., a mPCM), then the dispersing polymer is selected so as to have an affinity for the material of which the shells are formed.

As this first melt is heated, the PCM is uniformly dispersed throughout the first melt, and the water is driven off of the first melt. Upon cooling, the resulting solid is mechanically processed, such as by pulverizing, to form granules that contain the PCM.

A second polymer, which can be called a matrix polymer, is then melted, and the above-mentioned granules are added to this second melt. This second polymer can be called an article-specific polymer since it is selected to have an affinity for the dispersing-polymer, and to also have physical properties that are desirable for the final extruded article.

Upon cooling of this second melt, the resulting solid is processes to form concentrate pellets. These concentrate pellets are then usable to form synthetic articles such as fibers, films, foams and injection-molded devices by way of an extrusion processes; for example, synthetic fibers are made by way of a melt spin process.

A variety of polymers, homopolymers, copolymers or blends of the polymers can be used as the matrix polymer. Non-limiting examples of such matrix polymers are (1) polyamides such as Nylon 6, Nylon 6/6, Nylon 12, polyaspartic acid, polyglutamic acid; (2) polyamines; (3) polyimides; (4) polyacrylics such as polyacrylamide, polyacrylonitrile, and esters of methacrylic acid and acrylic acid; (5) polycarbonates such as polybisphenol A carbonate, and polypropylene carbonate; (6) polydienes such as polybutadiene, polyisoprene, and polynorbornene; (7) polyepoxides; (8) polyesters such as polyethylene terephthalate, polybutylene terephthalate, polytrimethylene terephthalte, polycapro lactone, polyglycolide, polylactide, polyhydroxybutyrate, polyhydroxyvalerate, polyethylene adipate, polybutylene adipate and polypropylene succinate; (9) polyethers such as polyethylene glycol (polyethylene oxide), polybutylene glycol, polypropylene oxide, polyoxymethylene (paraformaldehyde), polytetramethylene ether (polytetrahydrofuran), polyepichlorohydrin; (10) polyflourocarbons; (11) formaldehyde polymers such as urea-formaldehyde, melamine-formaldehyde, and phenol formaldehyde; (12) natural polymers such as cellulosics, chitosans, lignins, and waxes: (13) polyolefins such as polyethylene, polypropylene, polybutylene, polybutene, polyoctene; (14) polyphenylenes such as polyphenylene oxide, polyphenvlene sulfide and polyphenylene ether sulfone; (15) silicon containing polymers such as polydimethyle siloxane, and polycarbomethyl silane; (16) polyurethanes; (17) polyvinyls such as polyvinyl butryal, polyvinyl alcohol, polyvinyl acetate, polystyrene, polymethylstyrene, polyvinyl chloride, polyvinyl pyrrolidone, polymethyl vinyl ether, polyethyl vinyl ether, polyvinyl methyl ketone: (18) polyacetals; and (19) polyarylates.

The PCM may be dispersed in a variety of dispersing polymeric materials. Non-limiting examples of these dispersing polymers include those listed above, they may be homopolymers or copolymers, and they may vary in molecular weight functionality, and polymer chain architecture. Non-limiting examples include homopolymers of polyethylene, polypropylene, Nylon 12, polybutylene terephthalate, and copolymers such as polyethylene-co-vinyl acetate, polyethylene-co-acrylic acid, polybutylene terphthalate-co-polytetramethylene terephthalate, and polylauryllactam-block-polytetrahydrofuran.

High or low molecular weight materials may be used with lower molecular weight polymers being preferred for the dispersing polymer.

The functionality of the polymers can also be varied; for example, with the addition of amine, amide, carboxvl, hydroxyl, esters, ethers, epoxide, anhydrides, isocyanates, silanes, ketones, and aldehydes.

The polymer architecture may also be varied, examples being homopolymers, copolymers, linear polymers, branched polymers, block polymers, star polymers, comb polymers, dendritic polymers, graft copolymers and other combinations where branch arms or grafts may be the same or a different homopolymer or copolymer, and branch arms or grafts may be added in a controlled or a random manner.

EXAMPLE 1

As an example, about 5.0 pounds of a low molecular weight polyethylene homopolymer (A-C16 polyethylene, drop point of 102° C., manufactured by Honeywell Specialty Chemical) was added to a wet flushing apparatus, and the homopolymer was then slowly melted and mixed at from about 110 to about 130° C. Once the entire homopolymer was melted, about 8.47 pounds of a mPCM wet cake (micro PCM lot# M42-31, 59.0% solids, manufactured by MicroTek Laboratories, Inc.) was slowly added to the molten homopolymer over about a 30 minute time period.

Water was flashed off as the mPCM disperse within the homopolymer. Mixing of the dispersion continued until less than about 0.15 weight percent of the water remained (as measured using Karl-Fischer titration). The dispersion was then cooled and chopped for further processing, the chopped granules contained about 50 weight percent mPCM.

Melt spinnable concentrate pellets were then manufactured by dry blending about 30-pounds of the above-described granules with about 70-pounds of a high molecular weight fiber grade polypropylene thermoplastic resin (Polypropylene homopolymer 6852 from PB Amoco Polymers).

The resulting dry blend was then extruded using a 2½-inch single screw extruder with all zones set at about 230-degrees C., with a screw speed of about 70 rpm, with 150 mesh screens, and with a nitrogen purge, thus producing concentrate pellets of the invention.

The above-extruded extrudable/melt spinable concentrate pellets were then oven-dried overnite at about 50-degrees C. and at about 1 mm Hg of vacuum.

The concentrate pellets containing about 15 weight percent of mPCM, were then extruded/melt spun at temperatures between about 230 and 265-degrees C., and preferably at about 235 to 245-degrees C.

Filaments were spun/wound at takeup speeds of up to about 1600 meters per minute (mpm), and yielded from about 20 to about 6 deniers per filament of melt spun fibers having a temperature regulating characteristic with reversible thermal storage properties as was provided by the mPCM. Using Differential Scanning Calorimeter (DSC) testing, these fibers provided between about 17.5 and 23.2 J/g of thermal energy storage capacity.

DSC Testing and Analysis:

Differential Scanning Calorimeter (DSC) measurements of the above fibers were made using a Perkin Elmer Pyris 1 instrument. Cooling was accomplished using a FTS Systems Intercoller 1. Data analysis was performed using a Perkin Elmer Pyris Thermal Analysis System and Software for Windows, version 3.72.

Test samples were prepared in Perkin Elmer hermetically sealed aluminum sample pans, and testing was performed while the test samples were continuously subjected to $N_2$ flow.

Test conditions consisted of 1) cooling the test samples to about minus 10-degrees C., followed by 2) isothermal hold for about 1 minute at minus 10-degrees C., and 3) heating from minus 10-degrees C. to about 50-degrees C. at a rate of about 5-degrees C. per minute, followed by 4) isothermal hold for about 1 minute at 50-degrees C., and then 5) cooling from 50-degrees C. to about minus 10-degrees C. at a rate of about 5-degrees C. per minute.

While the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the invention has been particularly shown and described with reference to preferred embodiments thereof, it will be understood by those skilled in the art that various other changes in form and detail may be made without departing from the spirit and scope of the invention.

What is claimed is:

1. A method of manufacturing polymer-based pellets useful in extrusion and melt spin manufacturing processes to form plastic articles, comprising the steps of:

providing at least one water-based phase change material;

providing a low molecular weight polymer having an affinity for the phase change material;

providing a high molecular weight polymer having an affinity for the low molecular weight polymer and having physical characteristics compatible with an intended use of the plastic articles;

melting the low molecular weight polymer to form a first melt;

uniformly blending the phase change material into the first melt to form a first blend;

cooling the first blend to form a first solid;

processing the first solid to form granules;

melting the high molecular weight polymer to form a second melt;

uniformly blending the granules into the second melt to form a second blend;

cooling the second blend to form a second solid; and processing the second solid to form the polymer-based pellets.

2. The method of claim 1 wherein said polymer-based pellets each contain from about 10 to about 30 weight percent of said phase change material.

3. The method of claim 1 wherein said low molecular weight polymer is selected from the group homopolymers of polyethylene, polypropylene, Nylon 12, polybutylene terephthalate, and copolymers of polyethylene-co-vinyl acetate, polyethylene-co-acrylic acid, polybutylene terphthalate-co-polytetramethylene terephthalate, and polylauryllactam-block-polytetrahydrofuran; and said high molecular weight polymer is selected from the group polyamides, polyamines, polyimides, polyacrylics, polycarbonates, polydienes, polyepoxides, polyesters, polyethers, polyflourocarbons, formaldehyde polymers, natural polymers, polyolefins, polyphenylenes, silicon containing polymers, polyurethanes, polyvinyls, polyacetals, and polyarylates.

4. The method of claim 1 wherein said phase change material is an encapsulated phase change material.

5. The method of claim 1 wherein said phase change material is physically confined to a plurality of physical volumes by the addition of a material selected from the group silica, fumed silica and zeolite.

6. The method of claim 1 wherein said step of processing said first-solid and said step of processing said second-solid each include an extrusion step.

7. The method of claim 1 wherein said step of adding said phase change material to said first-melt includes adding a wetcake of said phase change material to said first-melt, and including the step of heating said fir melt until a water content of said first-melt is reduced to at least about 0.15 weight percent.

8. The method of claim 7 wherein said polymer-based pellets each contain from about 15 to about 25 weight percent of said phase change material.

9. The method of claim 1 wherein said phase change material is micro encapsulated within a plurality of hollow shells, and wherein said low molecular weight polymer includes a polymer-constituent having an affinity for material forming said hollow shells.

10. The method of claim 1 wherein said phase change material is encased in a plurality of nylon shells and wherein said low molecular weight polymer includes a nylon constituent.

* * * * *